United States Patent
Ishii

(10) Patent No.: US 7,433,689 B2
(45) Date of Patent: Oct. 7, 2008

(54) METHODS AND APPARATUS FOR ACQUIRING SERVICE FROM A MORE DESIRABLE COMMUNICATION SYSTEM

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 762 days.

(21) Appl. No.: 10/315,619

(22) Filed: Dec. 10, 2002

(65) Prior Publication Data

US 2004/0110523 A1    Jun. 10, 2004

(51) Int. Cl.
  *H04Q 7/20* (2006.01)
  *H04M 3/00* (2006.01)
  *H04M 1/00* (2006.01)

(52) U.S. Cl. ............ 455/434; 455/419; 455/435.1; 455/551

(58) Field of Classification Search ......... 455/435.2, 455/517, 428, 426, 434, 415, 552, 552.1, 455/426.1, 422, 419, 435.1, 551; 370/349
See application file for complete search history.

(56) References Cited

U.S. PATENT DOCUMENTS

| | | | |
|---|---|---|---|
| 5,517,677 A | 5/1996 | Moon | |
| 5,734,980 A | 3/1998 | Hooper et al. | |
| 5,754,542 A | 5/1998 | Ault et al. | |
| 5,870,674 A | 2/1999 | English | |
| 5,950,130 A * | 9/1999 | Coursey | 455/432.1 |
| 5,995,829 A | 11/1999 | Broderick | |
| 6,075,988 A | 6/2000 | Anderson et al. | |
| 6,085,085 A | 7/2000 | Blakeney, II et al. | |
| 6,246,875 B1 * | 6/2001 | Seazholtz et al. | 455/432.1 |
| 6,282,419 B1 * | 8/2001 | Findikli | 455/434 |
| 6,400,948 B1 * | 6/2002 | Hardin | 455/434 |
| 6,415,148 B1 * | 7/2002 | Chiniga et al. | 455/434 |
| 6,466,802 B1 * | 10/2002 | Blakeney et al. | 455/552.1 |
| 7,043,239 B2 * | 5/2006 | Uchida | 455/432.1 |
| 7,313,365 B2 * | 12/2007 | Giacalone | 455/62 |
| 7,398,082 B2 * | 7/2008 | Schwinke et al. | 455/419 |
| 2001/0014606 A1 | 8/2001 | Jin-Hong | |

FOREIGN PATENT DOCUMENTS

JP    2000358268    12/2000

OTHER PUBLICATIONS

Niels Peter Skov Andersen, Draft Report of 3GPP TSG SA Workshop of UE in Idle Mode, Feb. 7, 2001.

* cited by examiner

*Primary Examiner*—Tilahun B Gesesse
(74) *Attorney, Agent, or Firm*—Madson & Austin

(57) ABSTRACT

A method for acquiring service from a more desirable wireless communication system while receiving service from a less desirable communication system is provided. The method may include acquiring service from a first communication system. The method may then involve waiting for a reattempt period that is related to a likelihood of acquiring service from a more desirable communication system. The method may then involve attempting to acquire service from a second communication system that is more desirable than the first communication system.

24 Claims, 9 Drawing Sheets

METHODS AND APPARATUS FOR ACQUIRING SERVICE FROM A MORE DESIRABLE COMMUNICATION SYSTEM

TECHNICAL FIELD

The present invention relates generally to wireless communication systems. More specifically, the present invention relates to methods and apparatus for acquiring service from a more desirable wireless communication system while receiving service from a less desirable wireless communication system.

BACKGROUND

"Wireless" is a term used to describe telecommunications in which modulated electromagnetic waves transmit information (e.g., voice, data, text, pictures, video, etc.) over part or all of a communication path. Wireless technology is rapidly evolving, and is playing an increasing role in the lives of people throughout the world.

Typically, the user of a wireless communication device acquires service from a wireless communication system operated by a wireless service provider. Examples of wireless communication systems include cellular telephone systems, PCS systems, satellite communication systems, and the like. Ordinarily, a wireless communication system is capable of providing service within a particular geographical region.

More than one communication system may provide service within the same geographical region. Some communication systems, however, are not as desirable as others. For example, some communication systems may offer better pricing, quality of service, support of unique features, etc. Accordingly, a wireless communication device may be configured to attempt to acquire service from the most desirable communication system within the current geographical region.

Sometimes, however, it may not be possible to acquire service from the most desirable communication system within the current geographical region. For example, the most desirable communication system may be temporarily unavailable due to system maintenance, faulty equipment, etc. In such a situation, the wireless communication device may be configured to acquire service from a less desirable communication system.

When a wireless communication device is receiving service from a less desirable communication system, a more desirable communication system may become available. Therefore, when receiving service from a less desirable communication system, many wireless communication devices make periodic attempts to acquire service from a more desirable communication system. However, some wireless communication devices may make such acquisition attempts too often, while other wireless communication devices may not make such acquisition attempts frequently enough.

Accordingly, benefits may be realized if means were provided to address one or more of the above problems.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

Figure 1:
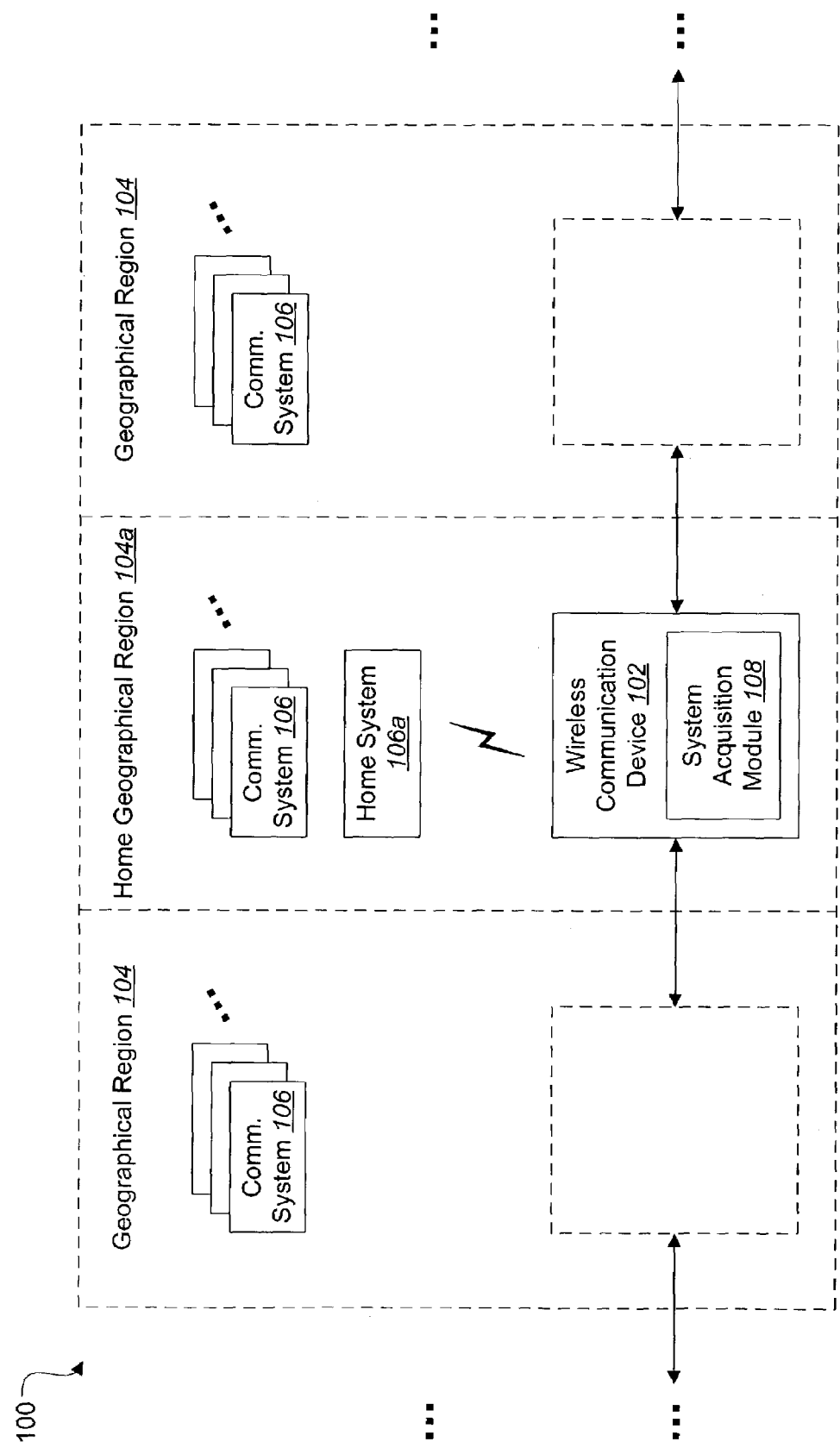
FIG. 1 is a block diagram of a wireless communication environment.

FIG. 1 is a block diagram of a wireless communication environment 100. Sometimes, wireless communication involves the use of a mobile wireless communication device 102, i.e., a wireless communication device that is capable of operation in more than one geographical region 104. Examples of mobile devices 102 include cell phones, pagers, personal digital assistants, laptop computers, and the like.

In order to conduct wireless communication, a mobile device 102 generally acquires service from a wireless communication system 106 operated by a wireless service provider. Examples of communication systems 106 include cellular telephone systems, PCS systems, satellite communication systems, and the like. Communication systems 106 may be configured to operate in accordance with any number of well-known standards, such as IS-95, IS-136, GSM, AMPS, etc. Ordinarily, a communication system 106 is capable of providing service within a particular geographical region 104.

Mobile devices 102 are typically configured to acquire service from a home communication system 106a whenever possible. The service provider that operates the home system 106a will be referred to hereinafter as a home service provider. The geographical region 104 covered by the home system 106a will be referred to hereinafter as the home geographical region 104a.

Sometimes, however, it may not be possible to acquire service from the home system 106a. For example, the mobile device 102 may be located outside the home region 104a. Even if the mobile device 102 is located inside the home region 104a, the home system 106a may be temporarily unavailable due to system maintenance, faulty equipment, etc.

The mobile device 102 may include a system acquisition module 108. The system acquisition module 108 may be configured to acquire service from a communication system 106. When it is not possible to acquire service from the home system 106a, the system acquisition module 108 may be configured to acquire service from a communication system 106 other than the home system 106a. Various embodiments of the system acquisition module 108 will be described below.

As shown in FIG. 1, more than one communication system 106 may provide service within the same geographical region 104. Some communication systems 106, however, are not as desirable as others. For example, some communication systems 106 may offer better pricing, quality of service, support of unique features, etc. Accordingly, the system acquisition module 108 may be configured to attempt to acquire service from the most desirable communication system 106 within the current geographical region 104. Various ways in which the system acquisition module 108 may determine which communication system 106 is the most desirable will be described below.

Sometimes, however, it may not be possible to acquire service from the most desirable communication system 106 within the current geographical region 104. For example, the most desirable communication system 106 may be temporarily unavailable due to system maintenance, faulty equipment, etc. In such a situation, the system acquisition module 108 may be configured to acquire service from a less desirable communication system 106.

When the mobile device 102 is receiving service from a less desirable communication system 106, a more desirable communication system 106 may become available. Thus, even when the mobile device 102 is already receiving service from a less desirable communication system 106, the system acquisition module 108 may be configured to make acquisition attempts on more desirable communication systems 106. Such acquisition attempts may be made from time to time until the mobile device 102 is receiving service from the most desirable communication system 106 in the current geographical region 104. Various ways in which the system acquisition module 108 may determine how often to make such acquisition attempts on more desirable communication systems 106 will be described below.

Figure 2:
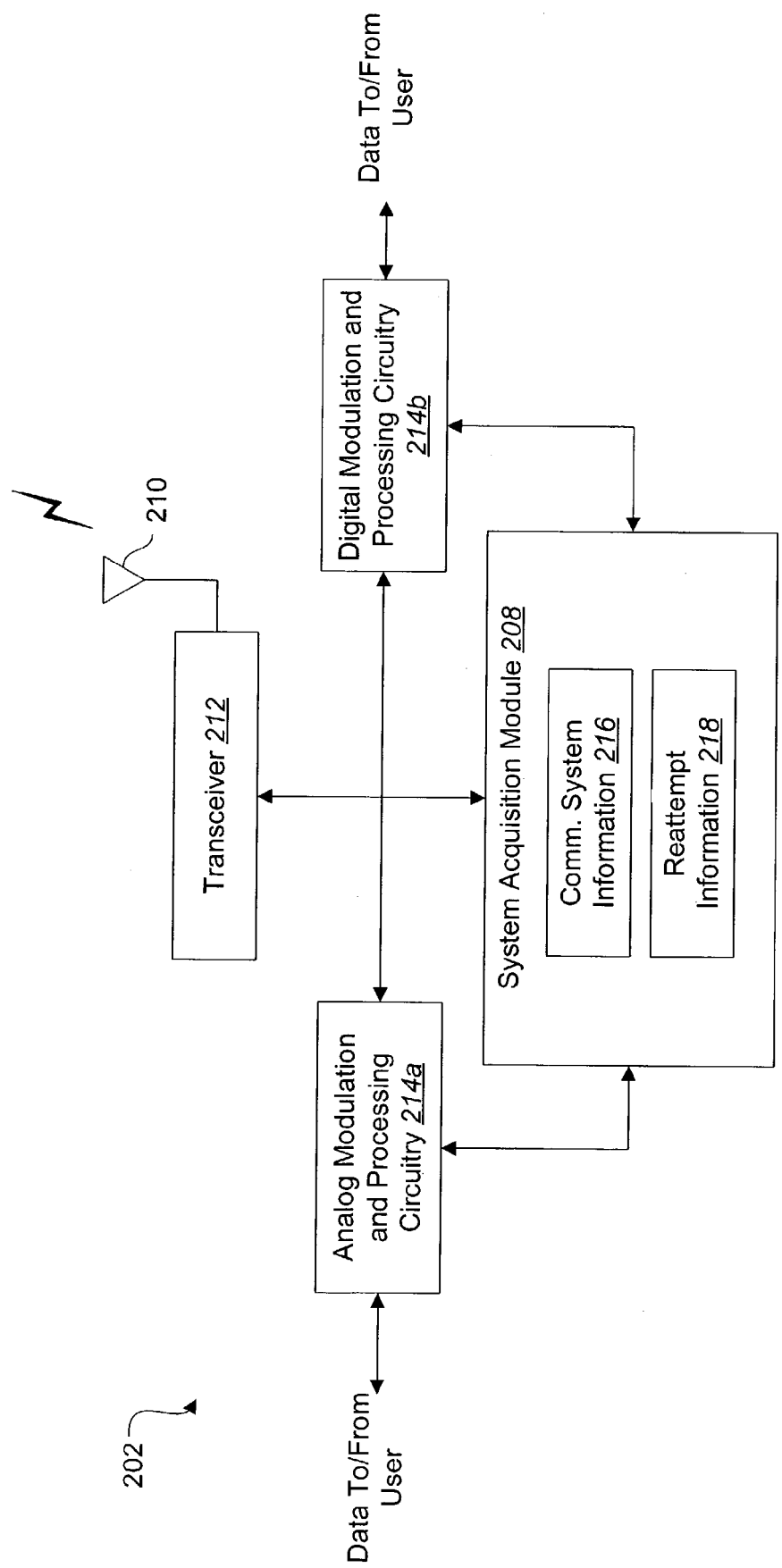
FIG. 2 is a block diagram of an embodiment of a mobile device.

FIG. 2 is a block diagram of an embodiment of a mobile device 202. The mobile device 202 may include an antenna 210, a transceiver 212, and modulation and processing circuitry 214. The antenna 210 may be configured to send and receive wireless communication signals. The transceiver 212 may include a transmitter portion configured to prepare a wireless communication signal to be sent by the antenna 210. The transceiver 212 may also include a receiver portion configured to prepare a wireless communication signal to be processed by the modulation and processing circuitry 214, which may be either analog 214a and/or digital 214b. Additional details about the antenna 210, transceiver 212, and modulation and processing circuitry 214 are well known to those skilled in the art.

The mobile device 202 may also include a system acquisition module 208. As stated previously, the system acquisition module 208 may be configured to acquire service from a communication system 106. In one embodiment, the system acquisition module 208 may include communication system information 216. The communication system information 216 may include information about the various communication systems 106 that are capable of providing service to the mobile device 202. Various embodiments of the communication system information 216 will be described below.

The system acquisition module 208 may also include reattempt information 218. As stated previously, when the mobile device 202 is receiving service from a less desirable communication system 106, the system acquisition module 208 may be configured to attempt to acquire service from a more desirable communication system 106. The reattempt information 218 may include information about how often such acquisition attempts may be made. Various embodiments of the reattempt information 218 will be described below.

Figure 3:
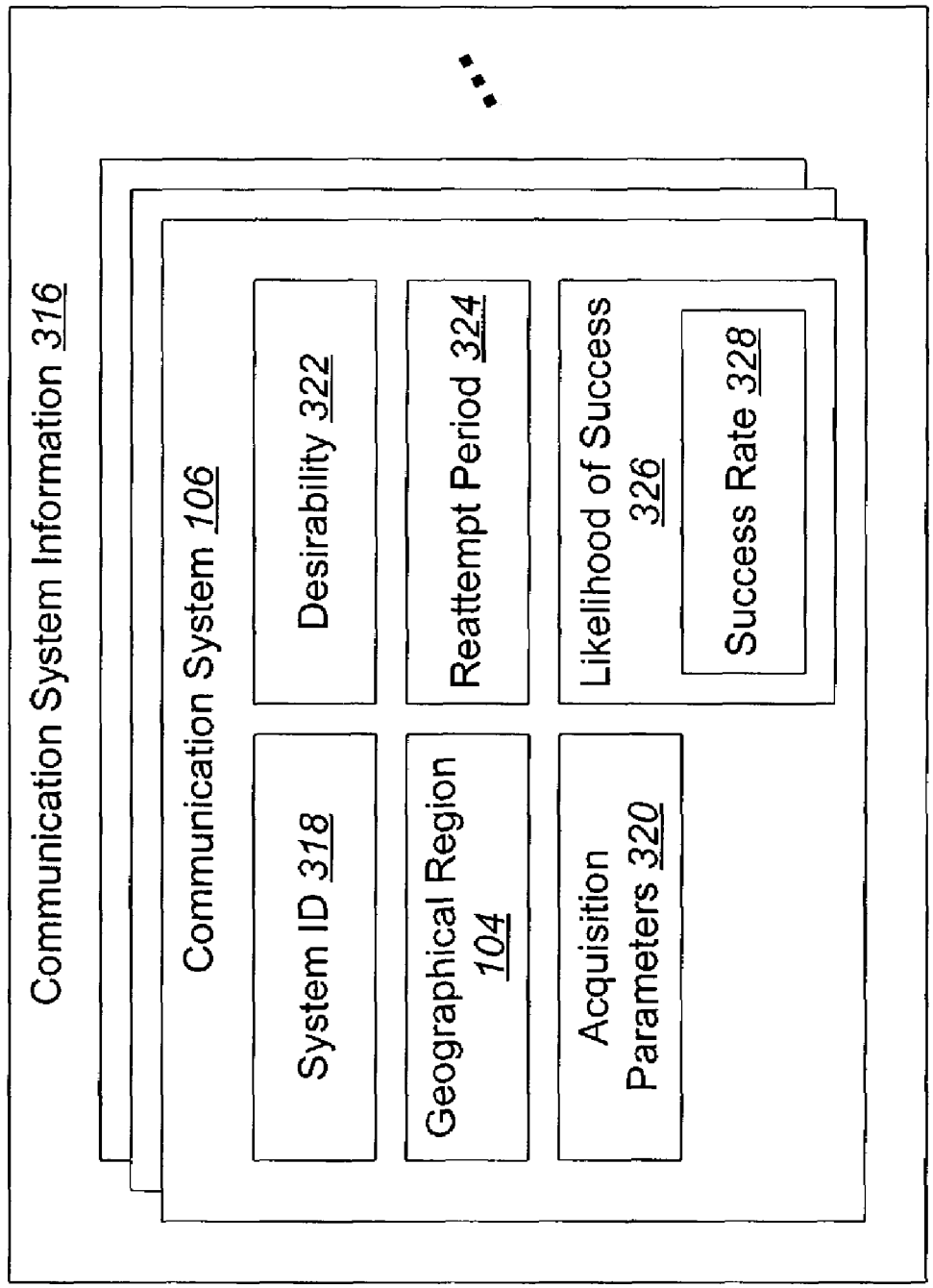
FIG. 3 is a block diagram of an embodiment of communication system information.

FIG. 3 is a block diagram of an embodiment of the communication system information 316. As stated previously, the communication system information 316 may be included within the system acquisition module 108 of a mobile device 102. The communication system information 316 may be stored in any data structure that is capable of organizing the communication system information 316 in the manner shown in FIG. 3. Examples of suitable data structures include a table, array, file, database, and the like. In one embodiment, the communication system information 316 may be provided to the mobile device 102 by the home service provider. For example, the communication system information 316 may be downloaded to the mobile device 102 when the mobile device 102 is located in the home region 104a and is receiving service from the home system 106a.

As shown, the communication system information 316 may be organized in such a way that certain pieces of information are associated with each communication system 106. For example, a system identifier 318 may be associated with each communication system 106. The system identifier 318 may uniquely identify the communication system 106. In one embodiment, the system identifier 318 may correspond to a system identifier 318 that is broadcast by the communication system 106 as part of an overhead message.

Various acquisition parameters 320 may also be associated with each communication system 106. The acquisition parameters 320 may be used to acquire service from a particular communication system 106. For example, the acquisition parameters 320 may include the band, channel, mode, etc. of the communication system 106.

A geographical region 104 may also be associated with each communication system 106. As stated previously, a communication system 106 is ordinarily capable of providing service within a particular geographical region 104. The geographical region 104 associated with each communication system 106 may be the geographical region 104 in which that communication system 106 is capable of providing service. In one embodiment, the geographical region 104 may be determined from the acquisition parameters 320.

As stated previously, some communication systems 106 are not as desirable as others. For example, some communication systems 106 may offer better pricing, quality of service, support of unique features, etc. Accordingly, a desirability 322 may also be associated with each communication system 106. The desirability 322 of a communication system 106 may be expressed in a variety of ways, including numbers, words, etc. In some embodiments, multiple communication systems 106 within the same geographical region 104 may share the same desirability 322. In other embodiments, each communication system 106 within a particular geographical region 104 may have a unique desirability 322.

As stated previously, when the mobile device 102 is receiving service from a less desirable communication system 106, the system acquisition module 108 may attempt to acquire service from a more desirable communication system 106. As shown, a reattempt period 324 may be associated with each communication system 106. The reattempt period 324 associated with a particular communication system 106 may specify the amount of time that the system acquisition module 108 waits between acquisition attempts when the mobile device 102 is receiving service from the communication system 106.

Each communication system 106 may also be associated with a likelihood 326 of successfully acquiring service from a more desirable communication system 106. The reattempt period 324 associated with the communication system 106 may be related to the likelihood 326 of success associated with the communication system 106. Typically, if there is a high likelihood 326 of success, the reattempt period 324 will be shorter than if there is a low likelihood 326 of success. In other words, the system acquisition module 108 will ordinarily make more frequent acquisition attempts if there is a high likelihood 326 of success than if there is a low likelihood 326 of success.

The likelihood 326 of success may be proportional to a success rate 328 of previous acquisition attempts made under similar circumstances. In the embodiment shown in FIG. 3, the likelihood 326 of success may be proportional to a success rate 328 of acquisition attempts made while the mobile device 102 is receiving service from the communication system 106. The success rate 328 may be calculated by keeping track of the total number of acquisition attempts made and the number of successful acquisition attempts made while the mobile device 102 is receiving service from the communication system 106.

Figure 4:
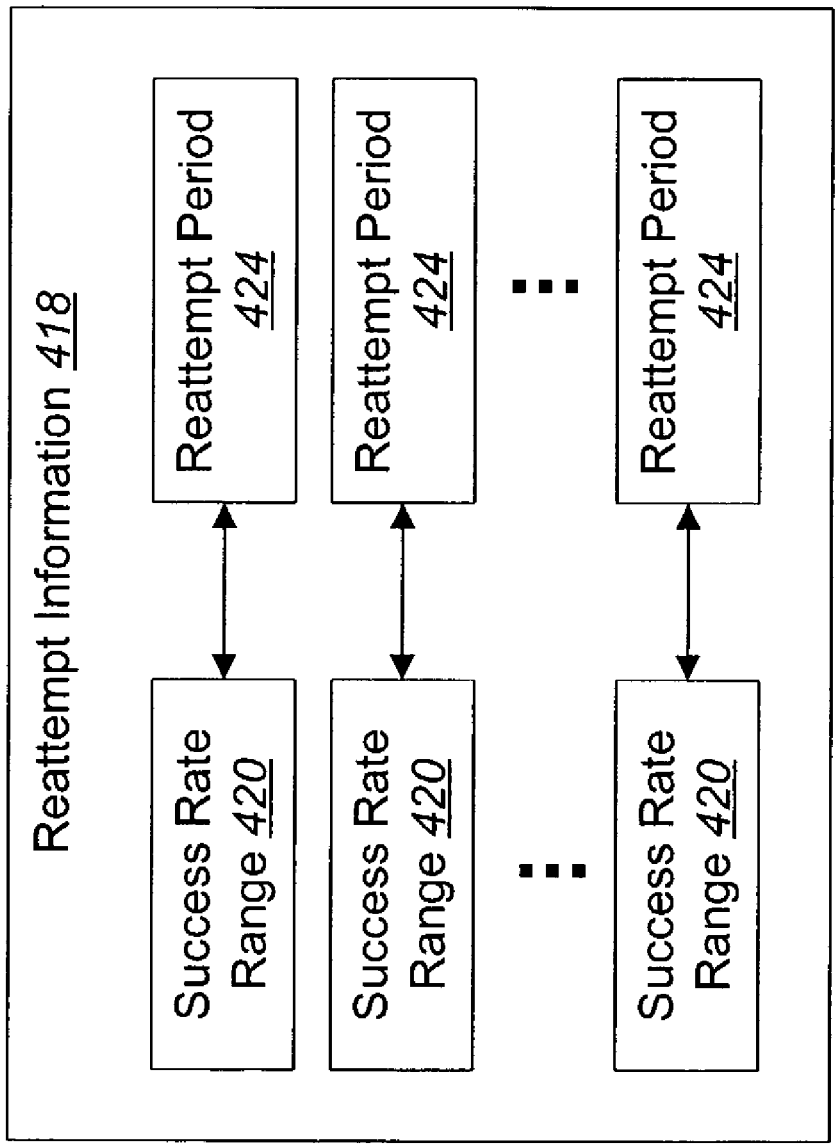
FIG. 4 is a block diagram of an embodiment of reattempt information.

FIG. 4 is a block diagram of an embodiment of the reattempt information 418. As stated previously, the reattempt information 418 may be included within the system acquisition module 108 of a mobile device 102. The reattempt information 418 may be stored in any data structure that is capable of organizing the reattempt information 418 in the manner shown in FIG. 4. Examples of suitable data structures include a table, array, file, database, and the like. In one embodiment, the reattempt information 418 may be provided to the mobile device 102 by the home service provider. For example, the reattempt information 418 may be downloaded to the mobile device 102 when the mobile device 102 is located in the home region 104a and is receiving service from the home system 106a.

As stated previously, the likelihood 326 of success may be proportional to a success rate 328 of previous acquisition attempts made by the mobile device 102. In such an embodiment, the reattempt information 418 may include a plurality of ranges 420 of success rates 328. Examples of ranges 420 of success rates 328 may be 10% to 20%, 20% to 30%, 30% to 40%, etc. Each range 420 may be associated with a predetermined reattempt period 424. In general, the higher the success rates 328 within a range 420, the shorter the predetermined reattempt period 424 associated with that range 420.

Figure 5:
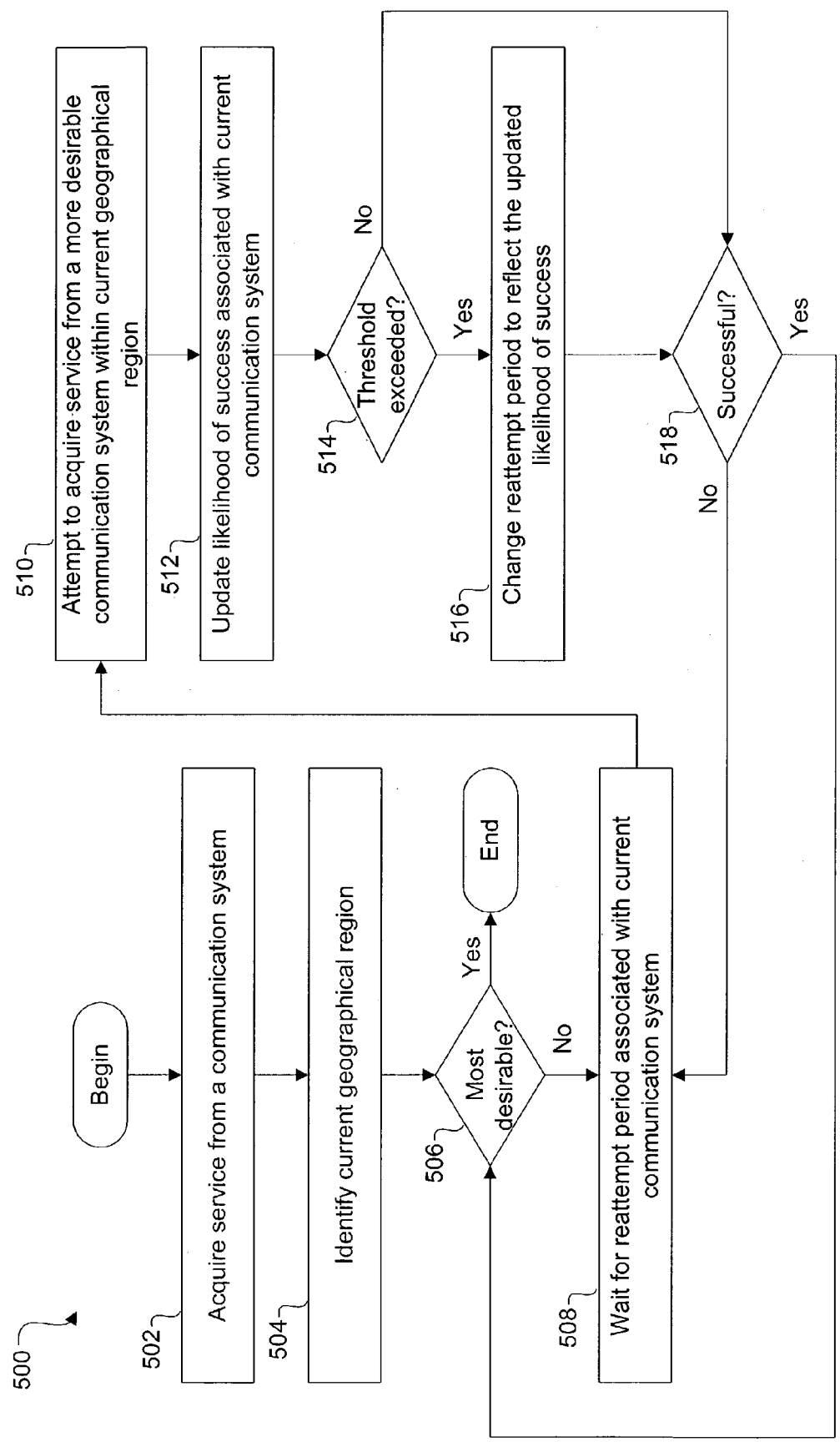
FIG. 5 is a flow diagram illustrating an embodiment of a method for attempting to acquire service from a more desirable communication system within a geographical region.

FIG. 5 is a flow diagram illustrating an embodiment of a method 500 for attempting to acquire service from a more desirable communication system 106 within a geographical region 104. The method 500 may be performed by the system acquisition module 108.

The method 500 may begin by acquiring 502 service from a communication system 106. The method 500 may then involve identifying 504 the current geographical region 104. In one embodiment, this may involve receiving a system identifier 318 from the current communication system 106 in an overhead message, identifying the communication system 106 associated with the system identifier 318, and then identifying the geographical region 104 associated with the communication system 106. In another embodiment, the mobile device 102 may be equipped with location determination means, such as a GPS receiver.

The method 500 may then involve determining 506 whether the current communication system 106 is the most desirable within the current geographical region 104. In one embodiment, this may involve identifying the desirability 322 of the current communication system 106, and then determining whether another communication system 106 that is capable of providing service in the current geographical region 104 has a higher desirability 322.

If the current communication system 106 is the most desirable within the current geographical region 104, the method 500 may end. If not, the method 500 may involve waiting 508 for the reattempt period 324 associated with the current communication system 106. As discussed previously, the reattempt period 324 may be associated with a likelihood 326 of successfully acquiring service from a more desirable communication system 106. In one embodiment, if there is a high likelihood 326 of success, the reattempt period 324 may be relatively short. If there is a low likelihood 326 of success, the reattempt period 324 may be relatively long.

The method 500 may then involve attempting 510 to acquire service from a more desirable communication system 106 within the current geographical region 104. This may involve sequentially attempting to acquire service from the systems 106 in the current geographical region 104 that have a higher desirability 322 than the current system 106. In one embodiment, the most desirable systems 106 may be attempted first, followed by the next most desirable systems 106, and so forth.

Whether or not service is acquired from a more desirable system 106, the method 500 may then involve updating 512 the likelihood 326 of success associated with the current communication system 106. Typically, if service was successfully acquired in step 510, the likelihood 326 of success will increase. Conversely, if service was not successfully acquired in step 510, the likelihood 326 of success will ordinarily decrease. As discussed previously, in one embodiment the likelihood 326 of success may be proportional to a success rate 328 of acquisition attempts made while the mobile device 102 is receiving service from the communication system 106.

The method 500 may then involve determining 514 whether the number of acquisition attempts made by the mobile device 102 while receiving service from the current system 106 exceeds a threshold value. If not, the method 500 may proceed directly to step 518. If so, the method 500 may involve changing 516 the reattempt period 324 associated with the current system 106 to reflect the updated likelihood 326 of success. In one embodiment, changing 516 the reattempt period 324 may involve decreasing the reattempt period 324 if the likelihood 326 of success was increased in step 512. Conversely, changing 516 the reattempt period 324 may involve increasing the reattempt period 324 if the likelihood 326 of success was decreased in step 512.

As discussed previously, in one embodiment the likelihood 326 of success may be proportional to a success rate 328 of acquisition attempts made while the mobile device 102 is receiving service from the current system 106. In addition, as also discussed previously, the system acquisition module 108 may include reattempt information 418, which may include a plurality of ranges 420 of success rates 328. Each range 420 of success rates 328 may be associated with a predetermined reattempt period 424. In such an embodiment, changing 516 the reattempt period 324 may involve identifying the success rate 328 of acquisition attempts made while receiving service from the current system 106, identifying the range 420 into which the success rate 328 falls, identifying the predetermined reattempt period 424 that is associated with the range 420, and then changing the reattempt period 324 associated with the current system 106 to match the predetermined reattempt period 424.

If in step 510 service was successfully acquired from a more desirable communication system 106, the method 500 may return to step 506 and proceed as described above. If, however, service was not successfully acquired, then the method 500 may return to step 508 and proceed as described above.

Figure 6:
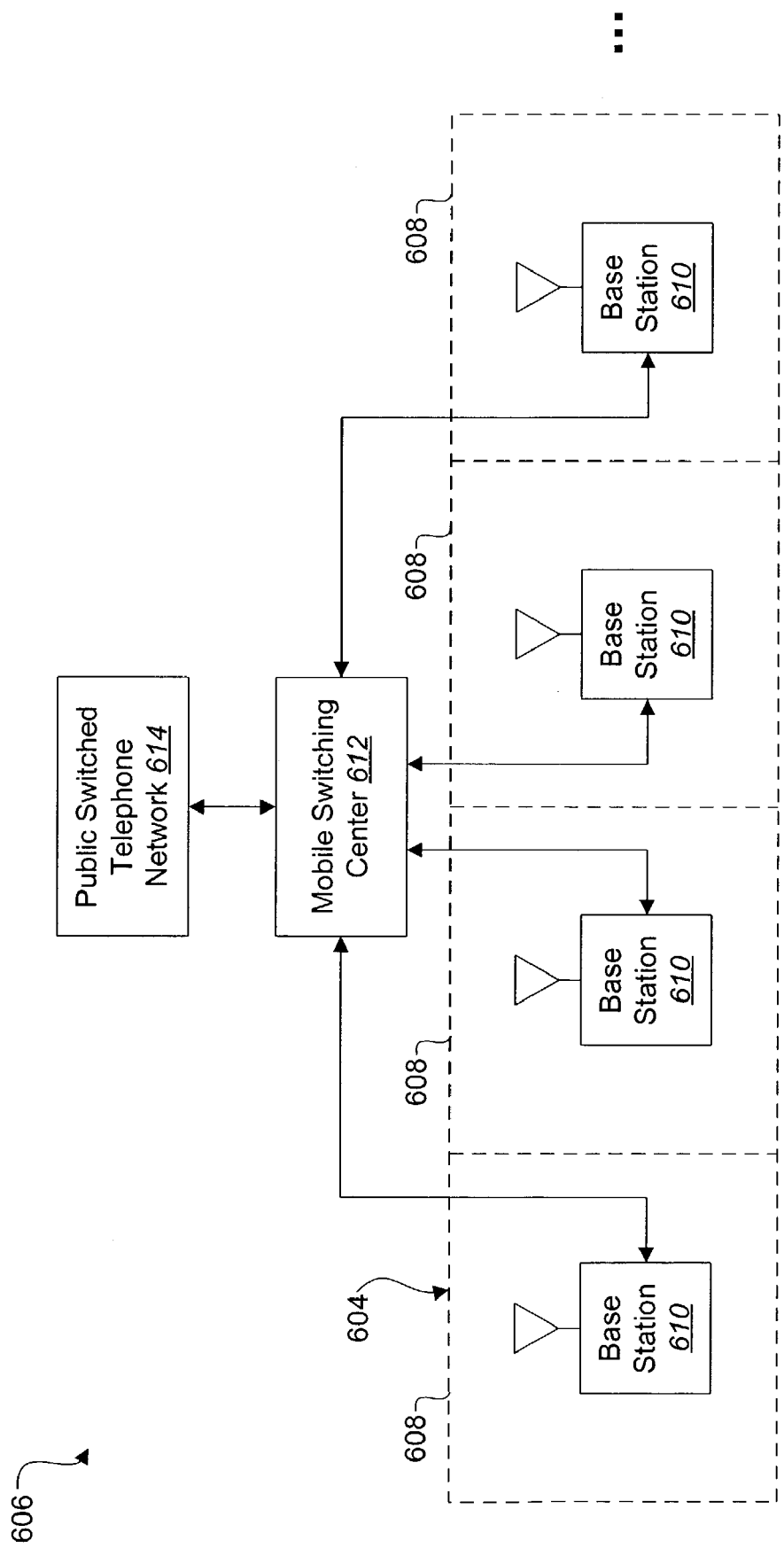
FIG. 6 is a block diagram of an embodiment of a communication system.

FIG. 6 is a block diagram of an embodiment of a communication system 606. The communication system 606 is capable of providing service to mobile wireless communication devices 102 within a particular geographical region 604.

As shown in FIG. 6, the geographical region 604 may be divided into a number of cells 608. Each cell 608 may include a base station 610. Acquiring service from the communication system 606 may involve establishing a wireless communication link between a mobile device 102 and a base station 610 in the cell 608 in which the mobile device 102 is located.

The system 600 may also include a mobile switching center (MSC) 612 that is in communication with each base station 610 in the geographical region 604. The MSC 612 may also be in communication with a central office in the public switched telephone network (PSTN) 614. The MSC 612 may be configured to switch calls among mobile devices 102 within the geographical region 604, and between mobile devices 102 and other devices connected to the PSTN 614. Communication between the base stations 610 and the MSC 612, and between the MSC 612 and the PSTN 614, may be wireless or wire-based (i.e., facilitated by the use of standard wire lines, such as twisted wire pairs, coaxial cables, fiber optic cables, etc.).

Figure 7:
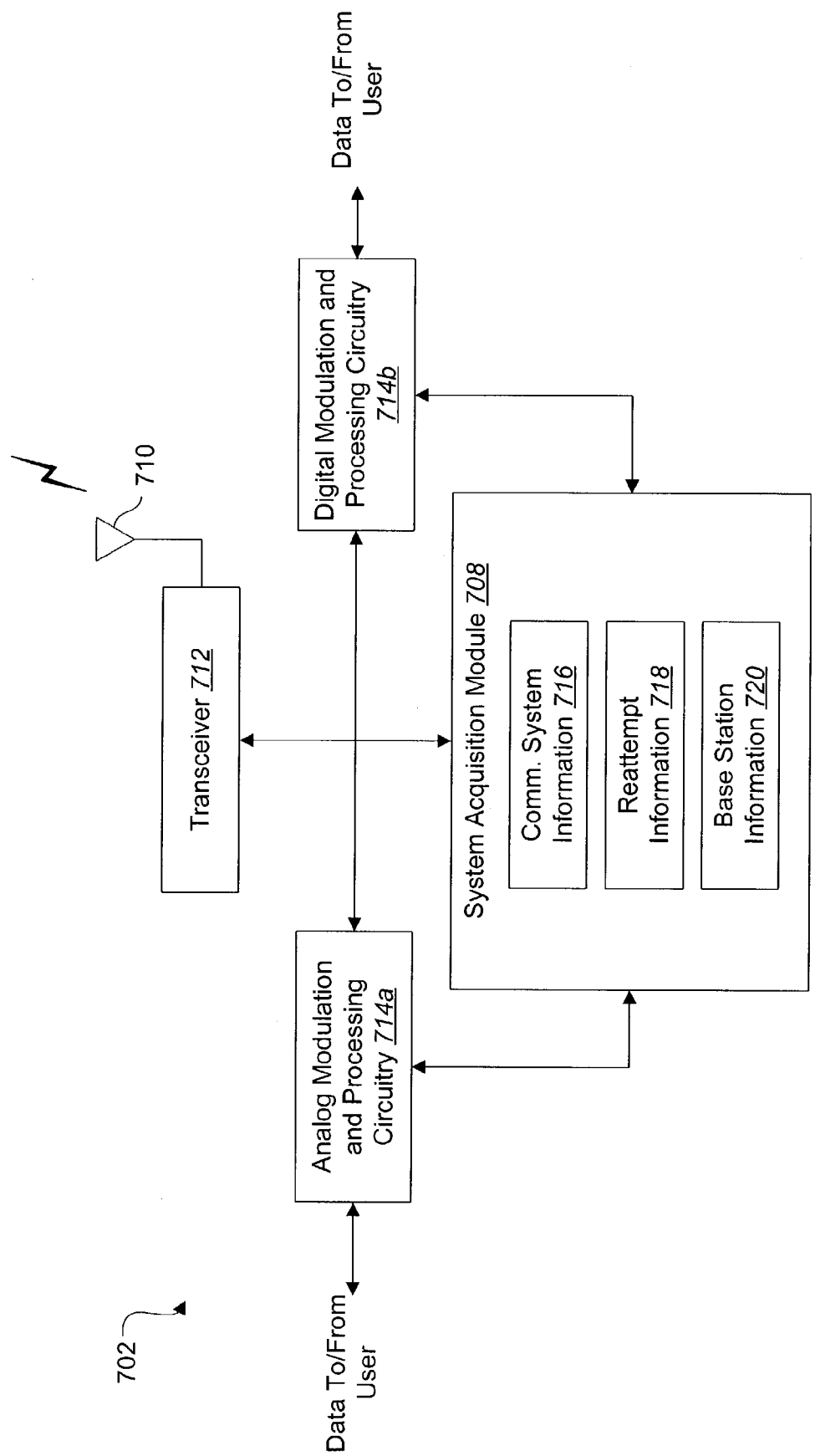
FIG. 7 is a block diagram of another embodiment of a mobile device.

FIG. 7 is a block diagram of another embodiment of a mobile device 702. The mobile device 702 shown in FIG. 7 is similar to the mobile device 702 shown in FIG. 2, except for the following. In FIG. 7, the system acquisition module 708 includes base station information 720. The base station information 720 includes information about the various base stations 610 that are capable of establishing a wireless communication 111k with the mobile device 702. Various embodiments of the base station information 720 will be described below.

Figure 8:
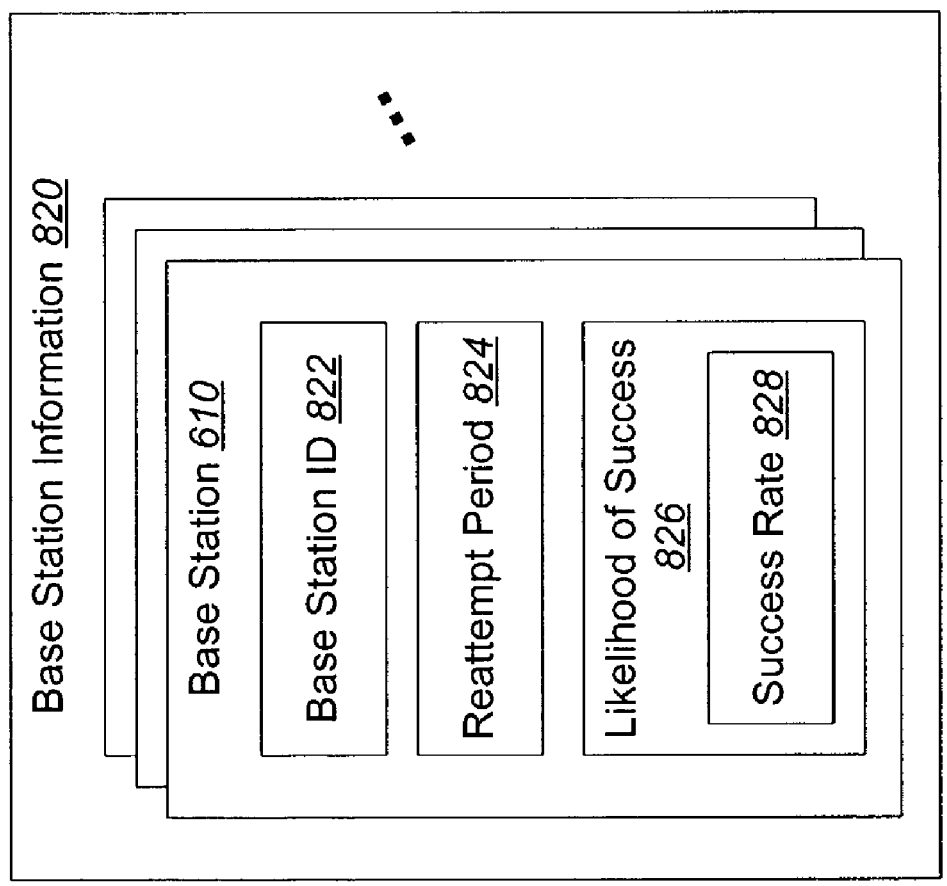
FIG. 8 is a block diagram of an embodiment of base station information.

FIG. 8 is a block diagram of an embodiment of the base station information 820. The base station information 820 may be stored in any data structure that is capable of organizing the base station information 820 in the manner shown in FIG. 8. Examples of suitable data structures include a table, array, file, database, and the like. In one embodiment, the base station information 820 may be provided to the mobile device 102 by the home service provider. For example, the base station information 820 may be downloaded to the mobile device 102 when the mobile device 102 is located in the home region 104a and is receiving service from the home system 106a. In some embodiments, data may be added to the base station information 820 whenever the mobile device 102 discovers a new base station 610.

As shown, the base station information 820 may be organized in such a way that certain pieces of information are associated with each base station 610. For example, a base station identifier 822 may be associated with each base station 610. The base station identifier 822 may uniquely identify the base station 610. In one embodiment, the base station identifier 822 associated with a base station 610 may correspond to the base station identifier 822 that is broadcast by the base station 610 as part of an overhead message.

As stated previously, when the mobile device 102 is receiving service from a less desirable communication system 106, the system acquisition module 108 may attempt to acquire service from a more desirable communication system 106. As previously discussed, a reattempt period 324 may be associated with each communication system 106. The reattempt period 324 associated with a particular communication system 106 may specify the amount of time that the system acquisition module 108 waits between acquisition attempts when the mobile device 102 is receiving service from the communication system 106.

As shown in FIG. 8, however, a reattempt period 824 may alternatively be associated with each base station 610 in the communication system 106. The reattempt period 824 associated with a base station 610 may specify the amount of time that the system acquisition module 108 waits between acquisition attempts while the mobile device 102 is in communication with the base station 610.

Each base station may also be associated with a likelihood 826 of successfully acquiring service from a more desirable communication system 606. As before, the reattempt period 824 associated with the communication system 106 may be related to the likelihood 826 of success associated with the communication system 106. That is, the system acquisition module 108 will ordinarily make more frequent acquisition attempts if there is a high likelihood 826 of success than if there is a low likelihood 826 of success.

As before, the likelihood 826 of success may be proportional to a success rate 828 of previous acquisition attempts made under similar circumstances. In the embodiment shown in FIG. 8, the likelihood 826 of success associated with a base station 610 may be proportional to a success rate 828 of previous acquisition attempts made while the mobile device 102 is in communication with the base station 610.

Figure 9:
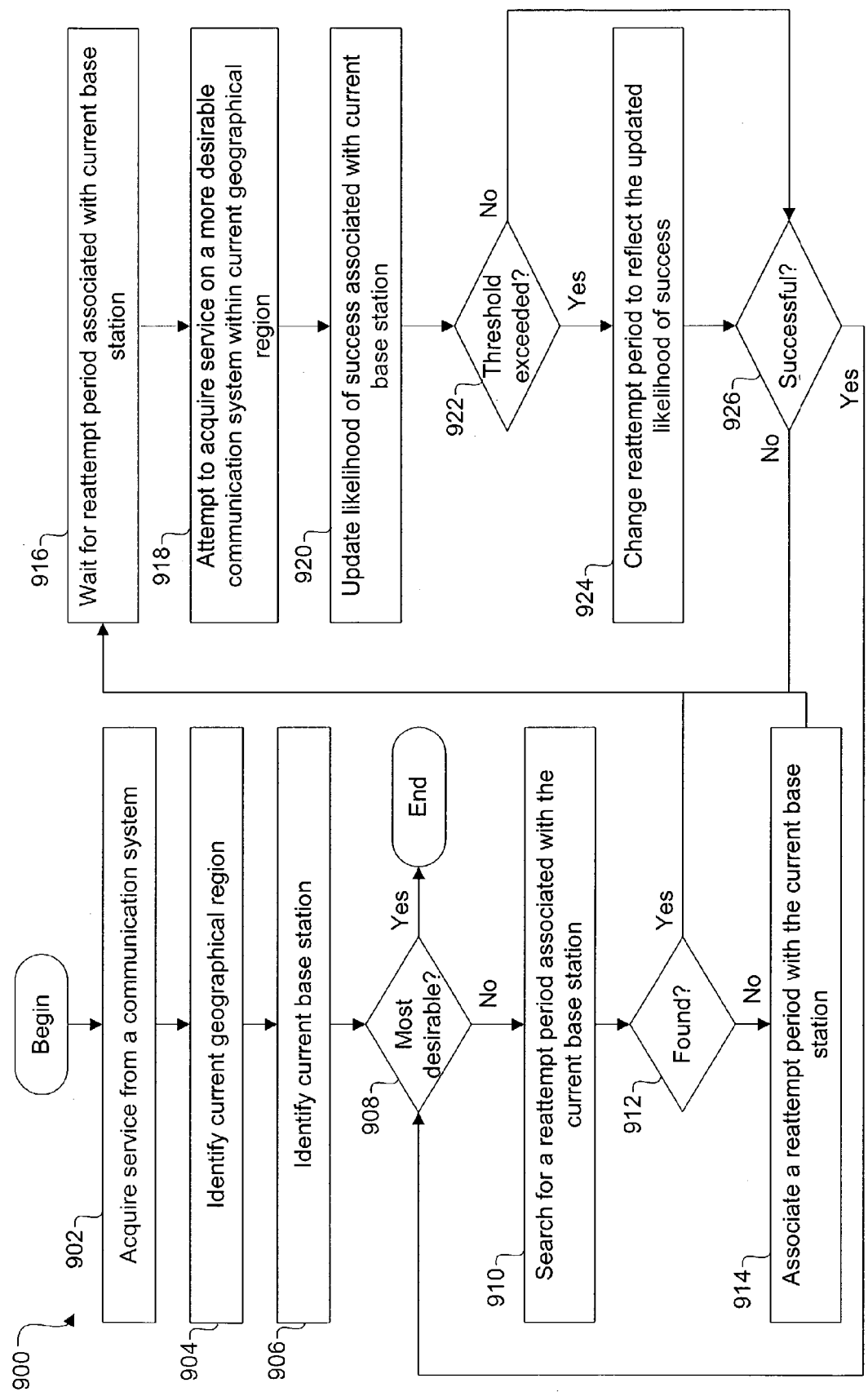
FIG. 9 is a flow diagram illustrating another embodiment of a method for attempting to acquire service from a more desirable communication system within a geographical region.

FIG. 9 is a flow diagram illustrating another embodiment of a method 900 for attempting to acquire service from a more desirable communication system 106 within a geographical region 104. The method 900 may be performed by the system acquisition module 108.

The method 900 may begin by acquiring 902 service from a communication system 106. In the embodiment shown in FIG. 9, acquiring 902 service from a communication system 106 may involve establishing communication with a base station 610 in the communication system 106. The method 900 may then involve identifying 904 the current geographical region 104, as described previously in connection with FIG. 5. The method 900 may then involve identifying 906 the current base station 610. In one embodiment, this may involve receiving a base station identifier 822 in an overhead message, and then identifying the base station 610 associated with the base station identifier 822.

The method 900 may then involve determining 908 whether the current communication system 106 is the most desirable within the current geographical region 104. In one embodiment, this may involve identifying the desirability 322 of the current communication system 106, and then determining whether another communication system 106 in the current geographical region 104 has a higher desirability 322.

If the current communication system 106 is the most desirable within the current geographical region 104, the method 900 may end. If not, the method 900 may involve searching 910 for a reattempt period 824 associated with the current base station 610. If a reattempt period 824 is already associated with the current base station 610, the method 900 may proceed directly to step 916. If a reattempt period 824 is not associated with the current base station 610, the method 900 may involve associating 914 a reattempt period 824 with the current base station 610. In some embodiments, associating 914 a reattempt period 824 may involve assigning a predetermined reattempt period 824 to the current base station 610.

The method 900 may then involve waiting 916 for the reattempt period 824 associated with the current base station 610. As discussed previously, the reattempt period 824 may be associated with a likelihood 826 of successfully acquiring service from a more desirable communication system 106 while in communication with the current base station 610. In one embodiment, if there is a high likelihood 826 of success, the reattempt period 824 may be relatively short. If there is a low likelihood 826 of success, the reattempt period 824 may be relatively long.

The method 900 may then involve attempting 918 to acquire service from a more desirable communication system 106 within the current geographical region 104. This may involve sequentially attempting to acquire service from the systems 106 in the current geographical region 104 that have a higher desirability 322 than the current system 106. In one embodiment, the most desirable systems 106 may be attempted first, followed by the next most desirable systems 106, and so forth.

Whether or not service is acquired from a more desirable system 106, the method 900 may then involve updating 920 the likelihood 826 of success associated with the current base station 610. Typically, if service was successfully acquired in step 918, the likelihood 826 of success will increase. Conversely, if service was not successfully acquired in step 918, the likelihood 826 of success will ordinarily decrease. In one embodiment, the likelihood 826 of success may be proportional to a success rate 828 of acquisition attempts made while the mobile device 102 is in communication with the current base station 610.

The method 900 may then involve determining 922 whether the number of acquisition attempts made by the mobile device 102 while in communication with the current base station 610 exceeds a threshold value. If not, the method 900 may proceed directly to step 926. If so, the method 900 may involve changing 924 the reattempt period 824 associated with the current base station 610 to reflect the updated likelihood 826 of success. In one embodiment, changing 924 the reattempt period 824 may involve decreasing the reattempt period 824 if the likelihood 826 of success was increased in step 920. Conversely, changing 924 the reattempt period 824 may involve increasing the reattempt period 824 if the likelihood 826 of success was decreased in step 920.

If in step 918 service was successfully acquired from a more desirable communication system 106, the method 900 may return to step 908 and proceed as described above. If, however, service was not successfully acquired, then the method 900 may return to step 916 and proceed as described above.

Those skilled in the art would understand that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a wireless communication device, a method comprising:
   determining a success rate of acquisition attempts made while the wireless communication device is receiving service from a first communication system;
   while receiving service from the first communication system, repeatedly attempting to acquire service from a more desirable communication system, wherein the wireless communication device waits for a reattempt period between successive acquisition attempts, and wherein the reattempt period is associated with the first communication system; and
   changing the reattempt period that is associated with the first communication system based on the success rate of previous acquisition attempts made while the wireless communication device is receiving service from the first communication system, wherein changing the reattempt period comprises decreasing the reattempt period as the success rate increases and increasing the reattempt period as the success rate decreases.

2. The method of claim 1, wherein determining the success rate of previous acquisition attempts comprises:
   determining how many successful acquisition attempts have been made while the mobile device is receiving service from the communication system;
   determining how many total acquisition attempts have been made while the mobile device is receiving service from the communication system; and
   dividing the successful acquisition attempts by the total acquisition attempts.

3. The method of claim 2, further comprising updating the success rate after each attempt to acquire service from the second communication system.

4. The method of claim 3, wherein changing the reattempt period comprises:
   determining that the total acquisition attempts that have been made while the mobile device is receiving service from the communication system exceeds a threshold value;
   identifying a success rate range that corresponds to the success rate of acquisition attempts made while the wireless communication device is receiving service from the first communication system; and
   identifying a value for the reattempt period that corresponds to the success rate range.

5. The method of claim 1, wherein changing the reattempt period comprises:
   decreasing the reattempt period as the success rate increases; and
   increasing the reattempt period as the success rate decreases.

6. The method of claim 1, wherein the wireless communication device is mobile.

7. In a mobile wireless communication device located in a geographical region, a method comprising:

acquiring service from a first communication system that is not the most desirable communication system in the geographical region;

determining a success rate of acquisition attempts made while the wireless communication device is receiving service from the first communication system;

while receiving service from the first communication system, repeatedly attempting to acquire service from a second communication system that is more desirable than the first communication system and that is capable of providing service within the geographical region, wherein the wireless communication device waits for a reattempt period between successive acquisition attempts, and wherein the reattempt period is associated with the first communication system; and changing the reattempt period that is associated with the first communication system based on the success rate of previous acquisition attempts made while the wireless communication device is receiving service from the first communication system, wherein changing the reattempt period comprises decreasing the reattempt period as the success rate increases and increasing the reattempt period as the success rate decreases.

8. The method of claim 7, wherein the previous acquisition attempts were made while the wireless communication device was receiving service from the first communication system.

9. The method of claim 7, wherein the first communication system comprises a base station, wherein acquiring service from the first communication system comprises establishing communication with the base station, and wherein the previous acquisition attempts were made while the wireless communication device was in communication with the base station.

10. The method of claim 7, further comprising updating the success rate after each attempt to acquire service from the second communication system.

11. The method of claim 7, wherein changing the reattempt period comprises:

identifying a predetermined reattempt period that is associated with a range of success rates that encompasses the success rate; and changing the reattempt period to match the predetermined reattempt period.

12. The method of claim 7, wherein the reattempt period is only changed if the number of acquisition attempts made by the mobile wireless communication device under similar circumstances exceeds a threshold value.

13. A wireless communication device, comprising:

an antenna configured to send and receive wireless communication signals;

a transceiver in electronic communication with the antenna;

modulation and processing circuitry in electronic communication with the transceiver; and a system acquisition module in electronic communication with the transceiver, the system acquisition module being configured to:

determine a success rate of acquisition attempts made while the wireless communication device is receiving service from a first communication system;

while receiving service from the first communication system, repeatedly attempt to acquire service from a more desirable communication system, wherein the wireless communication device waits for a reattempt period between successive acquisition attempts, and wherein the reattempt period is associated with the first communication system; and change the reattempt period that is associated with the first communication system based on the success rate of previous acquisition attempts made while the wireless communication device is receiving service from the first communication system, wherein changing the reattempt period comprises decreasing the reattempt period as the success rate increases and increasing the reattempt period as the success rate decreases.

14. The device of claim 13, wherein the first communication system comprises a base station, wherein acquiring service from the first communication system comprises establishing communication with the base station.

15. The device of claim 13, wherein the method further comprises updating the success rate after each attempt to acquire service from the second communication system.

16. The device of claim 15, wherein updating the success rate comprises:

increasing the success rate when the wireless communication device successfully acquires service from the second communication system; and decreasing the success rate when the wireless communication device does not successfully acquire service from the second communication system.

17. The device of claim 13, wherein changing the reattempt period comprises:

decreasing the reattempt period as the success rate increases; and increasing the reattempt period as the success rate decreases.

18. The device of claim 13, wherein the wireless communication device is mobile.

19. A mobile wireless communication device located in a geographical region, comprising:

an antenna configured to send and receive wireless communication signals;

a transceiver in electronic communication with the antenna;

modulation and processing circuitry in electronic communication with the transceiver; and a system acquisition module in electronic communication with the transceiver, the system acquisition module being configured to:

acquire service from a first communication system that is not the most desirable communication system in the geographical region;

determine a success rate of acquisition attempts made while the wireless communication device is receiving service from the first communication system;

while receiving service from the first communication system, repeatedly attempt to acquire service from a second communication system that is more desirable than the first communication system and that is capable of providing service within the geographical region, wherein the wireless communication device waits for a reattempt period between successive acquisition attempts, and wherein the reattempt period is associated with the first communication system; and change the reattempt period that is associated with the first communication system based on the success rate of previous acquisition attempts made while the wireless communication device is receiving service from the first communication system, wherein changing the reattempt period comprises decreasing the reattempt period as the success rate increases and increasing the reattempt period as the success rate decreases.

20. The device of claim 19, wherein the previous acquisition attempts were made while the wireless communication device was receiving service from the first communication system.

21. The device of claim 19, wherein the first communication system comprises a base station, wherein acquiring service from the first communication system comprises establishing communication with the base station, and wherein the previous acquisition attempts were made while the wireless communication device was in communication with the base station.

22. The device of claim 19, wherein the method further comprises updating the success rate after each attempt to acquire service from the second communication system.

23. The device of claim 19, wherein changing the reattempt period comprises:
    identifying a predetermined reattempt period that is associated with a range of success rates that encompasses the success rate; and
    changing the reattempt period to match the predetermined reattempt period.

24. The device of claim 19, wherein the reattempt period is only changed if the number of acquisition attempts made by the mobile wireless communication device under similar circumstances exceeds a threshold value.

* * * * *

UNITED STATES PATENT AND TRADEMARK OFFICE
CERTIFICATE OF CORRECTION

PATENT NO. : 7,433,689 B2  Page 1 of 1
APPLICATION NO. : 10/315619
DATED : October 7, 2008
INVENTOR(S) : Atsushi Ishii It is certified that error appears in the above-identified patent and that said Letters Patent is hereby corrected as shown below:

In Column 7, line 40 please replace "111k" with --link--.

Signed and Sealed this

Thirty-first Day of March, 2009

JOHN DOLL
*Acting Director of the United States Patent and Trademark Office*